United States Patent [19]

Schweiger et al.

[11] Patent Number: 4,486,380
[45] Date of Patent: Dec. 4, 1984

[54] METHOD OF SHUTTING DOWN A HIGH-TEMPERATURE REACTOR

[75] Inventors: Fritz Schweiger, Denzlingen; Jürgen Wohler, Hamm, both of Fed. Rep. of Germany

[73] Assignee: Hochtemperatur-Kernkraftwerk Gesellschaft mit beschränkter Haftung (HKG) Gemeinsame Europäisches Unternehmen, Hamm, Fed. Rep. of Germany

[21] Appl. No.: 286,160

[22] Filed: Jul. 23, 1981

Related U.S. Application Data

[63] Continuation-in-part of Ser. No. 79,068, Sep. 26, 1979, abandoned, which is a continuation of Ser. No. 928,434, Jul. 27, 1978, abandoned, which is a continuation of Ser. No. 801,338, May 27, 1977, abandoned, which is a continuation of Ser. No. 705,167, Jul. 14, 1976, abandoned, which is a continuation of Ser. No. 603,925, Aug. 12, 1975, abandoned, which is a continuation of Ser. No. 504,882, Sep. 11, 1974, abandoned, which is a continuation of Ser. No. 347,815, Apr. 4, 1973, abandoned.

[30] Foreign Application Priority Data

Apr. 13, 1972 [DE]  Fed. Rep. of Germany ....... 2217816

[51] Int. Cl.³ .............................................. G21C 7/32
[52] U.S. Cl. .................................... 376/210; 376/244; 376/381; 376/383
[58] Field of Search ................ 376/244, 210, 381, 383

[56] References Cited

U.S. PATENT DOCUMENTS

| | | | |
|---|---|---|---|
| 3,042,595 | 7/1962 | Cobb | 376/210 |
| 3,255,087 | 6/1966 | Maldague | 376/209 |
| 3,423,285 | 1/1969 | Curry | 376/210 |
| 3,519,536 | 7/1970 | Rausch | 376/381 |
| 3,620,315 | 11/1971 | Walton | 376/209 |
| 3,802,992 | 4/1974 | Griffith | 376/210 |

OTHER PUBLICATIONS

Lamarsh, "Introduction to Nuclear Reactory Theory" Addison-Wesley (1966), pp. 448-451.

*Primary Examiner*—Donald P. Walsh
*Attorney, Agent, or Firm*—Toren, McGeady and Stanger

[57] ABSTRACT

In the method of shutting down a high temperature nuclear reactor having a negative temperature coefficient of reactivity, such as a gas cooled pebble-bed nuclear reactor, while the core is operating in the critical state with the core having a predetermined critical average core temperature and with the heat generated in the critical state being removed by a coolant, effecting the shut down by reducing or discontinuing the removal of heat from the reactor core and increasing the average core temperature by an amount above the critical average core temperature for rendering the core hot subcritical due to the negative temperature coefficient of reactivity. The core can be maintained in the hot subcritical state by a controlled removal of after shut-down heat from the core.

15 Claims, 1 Drawing Figure

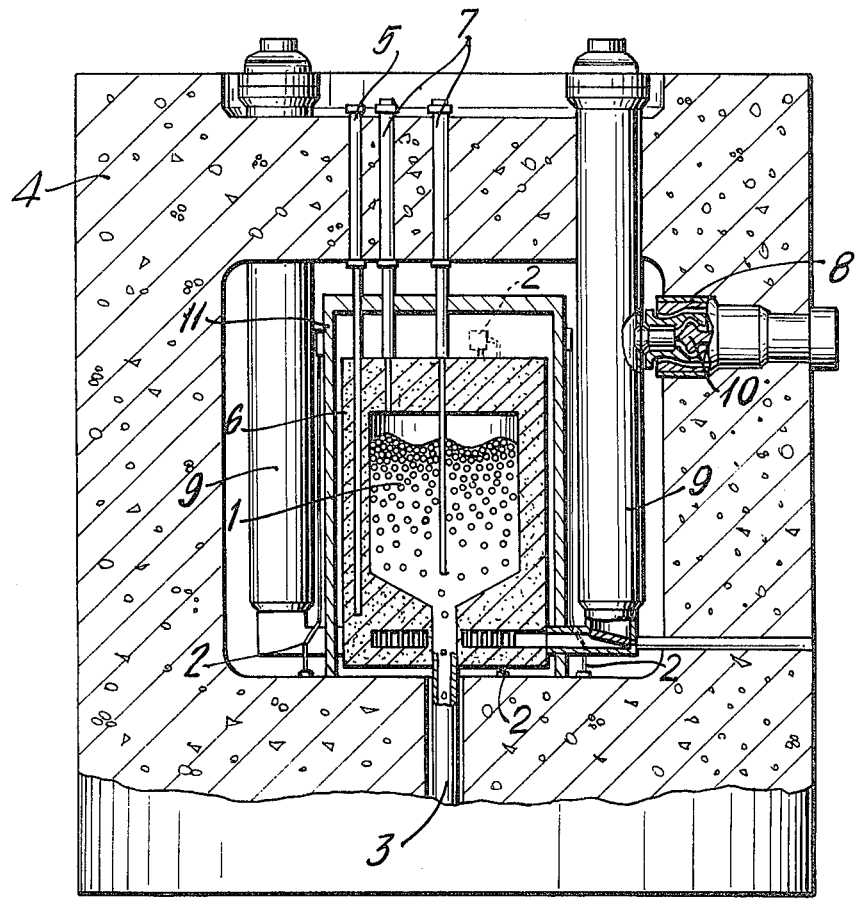

METHOD OF SHUTTING DOWN A HIGH-TEMPERATURE REACTOR

CROSS-REFERENCE TO RELATED APPLICATIONS

The present application is a continuation-in-part of application Ser. No. 79,068 filed Sept. 26, 1979 which application was a continuation of application Ser. No. 928,434 filed July 27, 1978, which application was a continuation of application Ser. No. 801,338 filed May 27, 1977, which application was a continuation of application Ser. No. 705,167 filed July 14, 1976, which application was a continuation of application Ser. No. 603,925, filed Aug. 12, 1975, which application was a continuation of application Ser. No. 504,882 filed Sept. 11, 1974, which application was a continuation of application Ser. No. 347,815, filed Apr. 4, 1973 all abandoned.

SUMMARY OF THE INVENTION

An indispensible prerequisite for the operation of nuclear reactors is to provide them with absolutely reliable shut-down systems. A large number of such systems are known, all based upon the principle of introducing neutron absorbers in some way into the region of the reactor core where the neutron physics effects occur. Shut-down or absorber rods containing neutron absorber material have been developed and used. They are introduced into the reactor core whenever needed either manually or automatically when an accident occurs, by automatic triggering of a safety circuit. Other methods of introducing neutron-absorbing materials are known, however, these are used usually as additional shut-down means. Such neutron-absorbing materials are usually in liquid or gaseous form, the physical state depending on the type of reactor coolant used.

These known shut-down methods comply with safety requirements to the extent that they are satisfied by the redundancy of the design, but with high temperature reactors having high outputs and correspondingly high power density, additional technological problems occur as a result of the fact that the absorber rods must be driven into the core itself, which is at an operating temperature in the hottest region of about 1000° C. to 1100° C. Accordingly, if a shut-down is initiated by introducing absorber rods into the core, the reactor heat or power produced in nuclear fission is reduced or interrupted, but the so-called decay heat or after shut-down heat still has to be accounted for. Owing to the high power density, for several hours after shut-down this heat will remain greater than the heat which can escape outwardly through the reflector of the reactor without a substantial rise in reactor temperature, in particular when there is a shut-down after a long run at full load. If suitable precautions are not taken, the resulting heat subjects the shut-down rods to unacceptably high temperature. Therefore, provision must be made for the satisfactory removal of after shut-down heat by suitable cooling, to avoid destruction of the shut-down rods. To ensure an adequate degree of safety, an extraordinary expenditure is required to provide the necessary redundancy of the after shut-down heat removal devices. Since the cooling-off of a reactor core having a negative temperature coefficient of reactivity signifies a relatively large reactivity gain (for example 3 to 8 Niles), many rods have to be introduced into the core. This means a substantially higher mechanical stress not only for the rods but also for the fuel elements. In addition to the above-described measures which are essential in the interest of safety, further disadvantages occur in these known shut-down methods, the effects of which are especially noticeable in subsequent operation of the reactor. It should be noted that in most cases, the reactor is started up again very shortly after shut-down, since the cause of the majority of shut-downs can be established and corrected within a relatively short time. For safety reasons, the speed at which absorber rods can be removed from the core is limited and with respect to the Xenon poisoning a relatively long period is needed to start the reactor. In addition, heating the core after it has cooled not only causes an appreciable additional time loss when starting up again, but also leads to undesired stresses caused by temperature changes in the core and its structures.

In this connection it should be noted that known high temperature reactors use, in addition to the shut-down rods for shutting down and running the reactor in a sub-critical state, other absorber rods for power regulation and to compensate for excess reactivity. These are known as control rods and operate continuously in the neutron flux. To reduce, as far as is possible, the temperature effects to which the control rods are subjected, they are located in a relatively cool part of the reactor, for example in the region of the coolant gas inlet to the core or in the region of the side reflector. In these regions the temperature environment of the control rods is acceptable and the neutron flux is still sufficiently high to ensure that the control rods are effective on the relatively low proportion of reactivity required for the regulating function. Because of their location, these control rods are not capable of shutting down the reactor and running it in the sub-critical state. The reactivity contribution of the control rods amounts, for example in a 300 MW electrical pebble-bed reactor with the control rods arranged in the side reflector, to a total of about 4 Niles, whereas for the cold sub-critical state of such a reactor a total reactivity absorption of about 18 Niles has to be provided by the shut-down rods which are inserted into the core. From this it is clear that it is not possible to shut down the reactor solely by using control rods which are located in positions where they are not adversely affected because of temperature. Shut-down rods are essential and they involve the aforementioned disadvantages.

Therefore, it is a primary object of the present invention to provide a method of reliably shutting down a high-temperature reactor having a negative temperature coefficient of reactivity so that it does not possess the above disadvantages and, in particular, affords protection for and, therefore, increases the life of the absorber or shut-down rods inserted into the core. The method affords the possibility of carrying out shut-down operations, especially those of short duration, which, from an operational viewpoint, is more favorable than has been possible in the past.

In accordance with the present invention, a method of shutting down a high-temperature nuclear reactor having a negative temperature coefficient of reactivity, involves raising the average core temperature above the critical average core temperature of the reactor by an increment so that the core is rendered hot sub-critical. This can be accomplished by completely cutting off the removal of heat or power from the core or by reducing the amount of heat removed and subsequently regulating the removal of decay or after shut-down heat to control the average core temperature. Accordingly, during shut-down, the core can be maintained in the hot sub-critical state by keeping the average core temperature above the critical average core temperature.

This method is based on the concept of incorporating the negative temperature coefficient of reactivity, present in high temperature reactors, into the shut-down operation as a determinative influencing parameter. Since the increase in the core temperature above the critical average core temperature leads to a negative reactivity, for practical purposes no further heat is generated by the fission reaction.

The U.S. Pat. No. 3,042,595, Cobb, et al, acknowledges the presence of the negative temperature coefficient of reactivity, however, it does not suggest its use in combination with shut-down absorber rods for operating a high temperature reactor. Note also the U.S. Pat. Nos. 3,519,536 to Rausch; 3,802,992 to Griffith et al; 3,620,315 to Walton; 3,255,087 to Maldague; 3,423,285 to Curry et al and Great Britain Pat. No. 862,145. These patents mention the temperature control of nuclear reactors, however, not for high temperature nuclear reactors and they do not suggest the reactor shut-down method of the present invention.

Due to the production of after shut-down heat as mentioned above, the shutting down operation embodied in the present invention is surprisingly simple to carry out, because the temperature of the core can be maintained by the after shut-down heat. Initially the shut-down is effected by at least reducing the removal of the heat generated in the fission reaction and then subsequently carrying out a regulated removal of after shut-down heat. When the method embodying the present invention is used in a high temperature gas cooled pebble-bed reactor having a negative temperature coefficient of reactivity, the critical average temperature in the range of 550° C. to 800° C. is raised initially into the range of 800° C. to 1300° C.

If the critical average core temperature in a 300 MW electrical pebble-bed reactor at full load is 630° C., and it is raised, in accordance with the present invention, by about 250° C., then with a negative temperature coefficient of reactivity of 2 m Niles/°C., it has a sub-criticality of 0.5 Nile. Accordingly, the reactor is rendered hot sub-critical without introducing shut-down rods into the core, solely by at least reducing or discontinuing the removal of power. The removal of heat or power can be effected by switching off the coolant gas blowers. In this way, the production of after shut-down heat in combination with the negative temperature coefficient of reactivity makes the method embodying the present invention inherently safe.

As indicated above, the production of after shut-down heat does not fall abruptly, therefore, in accordance with the method of the invention it is possible to maintain the temperature level in the core above the critical average core temperature for an extended period of time. After shut-down heat can be removed solely from the outer surface of the core, since, if this is not done, it may lead to an increase of the average core temperature which might have a damaging effect.

An increase of the average core temperature by 250° C., does not constitute a special operating condition even for the fuel elements, since the average core temperature in the fuel under full load, such as in the case of the above-mentioned pebble-bed reactor, is about 680° C. and the maximum temperature in the fuel is about 1250° C. If the reactor is shut down in accordance with the present invention, an increase in the average core temperature occurs, however, the maximum fuel temperature rises only insignificantly because the power output or heat generated during the fission reaction has been interrupted. A temperature compensation takes place in the core so that, when changing over from power generation to the removal of after shut-down heat, the temperature gradient which causes thermal stresses in the fuel elements is advantageously reduced.

The shut-down method embodying the present invention offers a number of advantages over the shut-down techniques used in the past. Apart from the fact that this method is inherently safer, due to the physics relationship, shut-down rods are not introduced into the core, at least in the initial stages of shut-down operation. As a result, the shut-down rods are not subjected to temperature stresses because in the initial stages of shut-down, they remain in the withdrawn position. Moreover, in short-term shut-downs, the losses of time usually associated with subsequent starting up are avoided, since the withdrawal of the shut-down rods and reheating of the reactor are eliminated. Further, substantial temperature stresses in the reactor and its components are avoided and this is of special significance, since shut-down rods normally constitute the most temperature-sensitive elements in a high-temperature reactor core.

Depending on operational requirements, there may be a number of variations in the sequence of the individual stages of the shut-down method embodying the present invention. In one embodiment, it is possible to carry out the regulated removal of after shut-down heat by using conventional power-removal devices incorporated in the reactor, since the withdrawal of heat or power is reduced or limited but is not completely interrupted. Alternatively, separate after shut-down heat removal devices may be provided for regulating the removal of after shut-down heat from the core when it has been made hot subcritical. Shutting down the reactor, especially where the removal of heat from the reactor in the critical stage is carried out using coolant gas blowers, can be executed without any appreciable delay. Therefore, in accordance with the present invention, it is possible to shut down the reactor immediately when an accident occurs or the reactor can be shut down when it is required even though no accident happens, without encountering the disadvantages which occur when shut-down rods are introduced directly into the core.

The regulated removal of decay-heat can, in accordance with another preferred feature of the invention, be carried out intermittently, that is, by operating the coolant gas blowers at a constant speed of rotation but for varied periods in accordance with the required heat removal.

It is also possible for the initial sequence of a long-term shut-down to use the method of the present invention, where the core, after its initial shut-down, is to be operated cold. In such a case the reactivity absorption of the control rods is not sufficient to bring the reactor to the cold sub-critical state. In accordance with a further feature of the invention, after the step of reducing or completely interrupting the removal of heat or power, at least some of the absorber or shut-down rods are introduced into the core during the removal of after shut-down heat. The removal of after shut-down heat is increased to drop the average core temperature. When the shut-down rods have been inserted the average core temperature for the critical state is lowered so that the shut-down rods can be introduced with the removal of after shut-down heat already being effected. Accordingly, the shut-down rods are introduced at a lower temperature below the normal operating temperature. Such operation affords greater protection for the shut-down rods. This procedure makes it possible to operate the shut-down rods without exchange during the whole lifetime of the reactor. It is also possible to utilize the shut-down rods as control rods, instead of control rods which are provided solely for control purposes.

In accordance with another feature of the invention, control rods can be inserted into the core, for example by 0.5 Nile, prior to interrupting or limiting the removal of power from the core and then maintaining the average core temperature by the removal of after-heat. This shut-down method is recommended when it is desired not to exceed the critical average core temperature during the shut-down operation. Nevertheless, in this embodiment of the present invention, the shut-down operation is achieved by a relative increase in the average core temperature above the critical average core temperature, since with the introduction of the control rods the critical average core temperature is lowered and followed by the regulated removal of heat to control the average core temperature and maintain its incremental difference above the critical average core temperature.

A very considerable advantage of the method embodying the present invention is involved in those shut-down situations where the removal of after shut-down heat commences with some time delay or if the removal of after shut-down heat fails after its commencement. In the previously known shut-down techniques, the removal of after shut-down heat comes into operation only after the introduction of the shut-down rods or if the removal of after shut-down heat fails during the first few minutes of the cooling, not only is the core still at a very high temperature but the relatively high production of after shut-down heat in this initial period rapidly increases the temperature of the core especially in that part into which the rods are inserted and only a short time is available for instituting operation of redundant devices for removing the after shut-down heat for the purpose of protecting the shut-down rods.

The method of the present invention avoids any damage to the shut-down rods resulting from high temperature and simultaneous high heat-up speed, since during the first stage in the production of after shut-down heat, the shut-down rods are not located within the core. These rods need to be introduced into the core only for the first time after the average core temperature has dropped below the operating temperature level, where the production of after shut-down heat, in accordance with its time curve, has dropped to an appreciably lower rate. Therefore, in the most unfavorable case, this value has dropped after five minutes to approximately one-half of its initial value, and after 30 minutes is about one-third of its initial value.

The subsequent introduction of the shut-down rods associated with the method in accordance with the present invention, and the lower temperature level achieved and the slower temperature increase which occurs if the removal of after shut-down heat fails after the shut-down rods have been introduced, leaves sufficient time to bring into operation other devices for removing after shut-down heat and such devices are present in any case for the sake of redundancy.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described preferred embodiments of the invention.

BRIEF DESCRIPTION OF THE DRAWING

The drawing is a schematic illustration of a high temperature gas cooled pebble-bed nuclear reactor embodying the present invention.

DETAIL DESCRIPTION OF THE INVENTION

In the drawing a high temperature pebble-bed nuclear reactor is illustrated having a negative temperature coefficient of reactivity. The reactor includes a pebble-bed core 1 into which individual fuel elements, in the form of balls or pebbles, are introduced through inlet ducts 2. The balls or fuel elements move downwardly through the pebble bed and are removed through an outlet duct 3 at the bottom of the core 1. The core 1 is enclosed within a reinforced concrete containment 4.

Control rods 5 are located within a reflector 6 arranged about the vertical periphery of the core for regulating reactivity during the fission reaction and maintaining the desired level of the removal of heat from the core. In addition, shut-down rods 7 are arranged for insertion directly into the pebble-bed core 1 in contact with the fuel elements to render the core sub-critical. In the drawing one of the shut-down rods 7 is shown inserted into the core. During normal critical operation, the shut-down rods are held out of the core.

The heat or power generated in the fission reaction is removed from the core by a gas coolant circulated by blowers 8. A number of pods 9 are distributed around the core, and contain the blowers 8 along with steam generators, not shown, through which the hot coolant gas is circulated to generate steam for converting the heat from the reactor into power. Each blower 8 includes a shut-off valve 10 for regulating flow of the coolant gas into the core.

A thermal shield 11 laterally encloses the reflector 6.

During operation the ball-shaped fuel elements are introduced uniformly to the top of the core and move downwardly during continuous core operation. The coolant gas is circulated into the core from the various pods 9, it removes the heat generated in the fission reaction, and conveys the heat to the steam generators, not shown, where steam is generated for subsequent use in the generation of electrical power or for other purposes.

As mentioned above, during normal operation, the shut-down rods 7 are held out of the core. The control rods 5 are inserted into the reflector in the region around the core for regulating criticality.

In accordance with the present invention, if some accident occurs initiating shut-down, the shut-down rods 7 are maintained out of the core, however, some or all of the valves 10 regulating the blowers 8 are closed cutting off the flow of the coolant gas through the core 1. With the reduction or complete termination of the flow of coolant gas, the average core temperature rises above the critical average core temperature so that the reactor is rendered hot sub-critical.

After a relatively short period of time, the removal of the decay or after shut-down heat generated within the core following shut-down, is commenced. The time period involved is in the range of about 5 to 20 minutes. The after shut-down heat can be removed by circulating the coolant gas through the core or, if necessary, devices, not shown, specifically provided for the removal of after shut-down heat can be utilized.

By maintaining the average core temperature at an increment above the critical average core temperature it is possible to maintain the core hot sub-critical for a desired time period. If, as is usually the case, the core is to be restarted after a short period of time, it is unnecessary to remove the shut-down rods, because they have not been inserted into the core. Further, the temperature of the core is such that reheating is unnecessary. Therefore, in accordance with the present invention, critical operation can be reinitiated in a relatively short time and with a minimum of effort by lowering the average temperature of the core by starting the blowers again.

As mentioned above, it is also possible to insert the control rods 5 into the region around the core to reduce criticality and lower the critical average core temperature. In this way, by regulating the flow of coolant gas the average core temperature can be maintained above the critical average core temperature so that the core is hot sub-critical.

If the reactor core is not going to be restarted within a short period of time, by inserting the shut-down rods 7 into the core 1 and increasing the removal of after shut-down heat, the core can be brought into the cold sub-critical state. Since the temperature within the core is reduced, the problem of exposing the shut-down rods 7 to excessively high temperature is avoided.

While specific embodiments of the invention have been shown and described in detail to illustrate the application of the inventive principles, it will be understood that the invention may be embodied otherwise without departing from such principles.

We claim:

1. A method of shutting down a high temperature pebble-bed nuclear reactor having a negative temperature coefficient of reactivity while it is operating in the critical stage with the reactor core having a predetermined critical average core temperature and the heat generated by the core in the critical state being removed by circulating a coolant fluid through the core, including the steps consisting essentially of at least reducing the removal of heat from the reactor core by the coolant fluid, and increasing the average core temperature by an increment above the critical average core temperature for rendering the core hot sub-critical due to the negative temperature coefficient of the reactivity.

2. A method, as set forth in claim 1, wherein effecting the step of at least reducing the removal of heat by completely cutting off the flow of coolant fluid through the core.

3. A method, as set forth in claim 1, wherein effecting the step of at least reducing the removal of heat by partially cutting off the flow of the coolant fluid through the core.

4. A method, as set forth in claim 1, wherein the critical average core temperature is in the range of 550° C. to 800° C. and increasing the average core temperature to a range of between 800° C. and 1300° C. for rendering the core hot sub-critical.

5. A method, as set forth in claim 1, wherein after increasing the average core temperature and with the core in the hot sub-critical state, intermittently removing the after shut-down heat generated within the reactor core.

6. A method, as set forth in claim 1, wherein after increasing the average core temperature for rendering the core hot sub-critical, removing after shut-down heat from the core by circulating coolant fluid therethrough for reducing the average core temperature and inserting absorber material into the core at the same time that the after shut-down heat is being removed.

7. A method, as set forth in claim 1, including the steps of inserting control rods into the region of the reactor adjoining the core for lowering the critical average core temperature before the step of at least reducing the removal of heat from the core for increasing the average core temperature.

8. A method of shutting down a gas-cooled high temperature pebble-bed reactor having a negative temperature coefficient of reactivity and the pebble-bed nuclear reactor including control rods for regulating reactivity during critical operation, absorber rods insertable directly into the pebble-bed core for shutting down reactivity, a multiple number of cooling loops including coolant gas blowers and circulating pipes connected to the core for circulating coolant gas through the core for removing heat, and valves in the cooling loops for regulating flow therethrough, wherein the shutting down method consists essentially of at least reducing the flow of coolant gas from the coolant loops through the reactor core for reducing the removal of heat from the core and increasing the average core temperature by an increment above the critical average core temperature for rendering the core hot-subcritical due to the negative temperature coefficient of reactivity.

9. A method, as set forth in claim 8, including limiting the flow of coolant gas by completely cutting off the flow of the coolant gas flowing through the cooling loops to the core.

10. A method, as set forth in claim 9, wherein after increasing the average core temperature for rendering the reactor core hot sub-critical, removing the after shut-down heat by circulating the coolant gas through at least certain of the cooling loops while maintaining the average core temperature above the critical average core temperature.

11. A method, as set forth in claim 8, including the step of removing the after shut-down heat at about 5 to 20 minutes after increasing the average core temperature for rendering the core hot sub-critical.

12. A method of shutting down a gas-cooled high temperature pebble-bed nuclear reactor having a negative temperature coefficient of reactivity and operating in the critical state with the reactor core having a predetermined critical average core temperature, the pebble-bed nuclear reactor including control rods for regulating reactivity during critical operation, absorber rods insertable into the pebble-bed reactor core for shutting down reactivity, and a multiple number of cooling loops including coolant gas blowers and circulating pipes connected to the core for circulating coolant gas through the core for removing heat, and valves in the cooling loops for controlled flow therethrough, wherein the shutting down method consists essentially of reducing the coolant gas flow through the reactor core to an extent that the average core temperature is increased above the critical average core temperature and thereby, due to the negative temperature coefficient, rendering the reactor core hot sub-critical, and after a given period of time, removing the after shut-down heat in a dosed manner by circulating the coolant gas for temporarily maintaining the core hot sub-critical, moving at least some of the control rods into the region of the core for lowering the critical average core temperature, increasing the flow of the coolant gas for removing after shut-down heat, and inserting absorber rods into the core for rendering the core cold sub-critical.

13. A method, as set forth in claim 12, including the step of commencing the removal of after shut-down heat from the hot sub-critical core about 5 to 20 minutes after the core is rendered sub-critical.

14. A method, as set forth in claim 12, wherein the critical average core temperature is in the range between 550° C. and 800° C. and increasing the average core temperature into the range of between 800° C. and 1300° C. for rendering the core hot sub-critical.

15. A method of shutting down a gas cooled high temperature pebble-bed reactor having a negative temperature coefficient of reactivity and operating in the critical state with the reactor core having a predetermined critical average core temperature, the pebble-bed nuclear reactor including control rods for regulating reactivity during critical operation, absorber rods for shutting down reactivity, and a multiple number of cooling loops including means for circulating coolant gas through the core for removing heat, wherein the shutting down method consists essentially of inserting the control rods for reducing the reactivity by an amount of about 0.5% for rendering the reactor core sub-critical and maintaining the average reactor core temperature above the critical average core temperature of the sub-critical core by limiting the flow of the coolant gas through the core.

* * * * *